US010021860B2

(12) United States Patent
Plante

(10) Patent No.: US 10,021,860 B2
(45) Date of Patent: Jul. 17, 2018

(54) KIT FOR ASSEMBLING AN AQUARIUM AQUAPONIC ASSEMBLY AND AQUARIUM AQUAPONIC ASSEMBLIES THEREOF

(71) Applicant: Robin Plante, Ste-Barbe (CA)

(72) Inventor: Robin Plante, Ste-Barbe (CA)

(73) Assignee: Robin Plante, Ste-Barbe (CA)

( * ) Notice: Subject to any disclaimer, the term of this patent is extended or adjusted under 35 U.S.C. 154(b) by 31 days.

(21) Appl. No.: 15/390,161

(22) Filed: Dec. 23, 2016

(65) Prior Publication Data

US 2017/0105393 A1  Apr. 20, 2017

Related U.S. Application Data

(63) Continuation-in-part of application No. 13/962,006, filed on Aug. 8, 2013.

(60) Provisional application No. 61/680,812, filed on Aug. 8, 2012, provisional application No. 61/756,234, filed on Jan. 24, 2013.

(51) Int. Cl.
| | |
|---|---|
| *A01K 63/00* | (2017.01) |
| *A01G 31/00* | (2018.01) |
| *A01K 63/04* | (2006.01) |
| *A01K 63/06* | (2006.01) |

(52) U.S. Cl.
CPC ............ *A01K 63/003* (2013.01); *A01G 31/00* (2013.01); *A01K 63/006* (2013.01); *A01K 63/042* (2013.01); *A01K 63/045* (2013.01); *A01K 63/047* (2013.01); *A01K 63/065* (2013.01)

(58) Field of Classification Search
CPC .......... A01G 31/00; A01G 31/02; A01G 7/00; A01G 2031/006; A01K 63/00; A01K 63/04; A01K 63/045; A01K 63/003; A01K 63/006; A01K 31/06; A01K 63/042; A01K 63/047; A01K 63/065
USPC .... 119/225–227, 246, 247; 47/1.01 R, 59 R, 47/62 R
See application file for complete search history.

(56) References Cited

U.S. PATENT DOCUMENTS

| | | | | |
|---|---|---|---|---|
| 3,255,731 A | * | 6/1966 | Girard | A01K 61/13 |
| | | | | 119/224 |
| 3,557,753 A | * | 1/1971 | Dantoni | A01K 63/045 |
| | | | | 119/260 |
| 3,994,807 A | * | 11/1976 | Macklem | A01K 63/04 |
| | | | | 119/261 |

(Continued)

*Primary Examiner* — Kathleen I Alker
*Assistant Examiner* — Danielle A Clerkley
(74) *Attorney, Agent, or Firm* — Brouillette LegaL Inc.; Robert Brouillette

(57) ABSTRACT

A kit for an aquarium aquaponic assembly is disclosed. The kit comprises generally an aquarium module, a garden module, a reservoir module, drain conduits fluidly connecting the modules and a pump. The reservoir module has a top opening adapted to receive and maintained both the aquarium module and at least one garden module. Each garden module supports terrestrial plants and is located directly adjacent to one side of the aquarium module and located below a predetermined operating water level of the aquarium module. The aquarium module comprises a transparent tank adapted to be partially supported by the reservoir module. The system is designed such that the waste water from the aquarium module flows to the garden module for irrigating and feeding the plants. The waste water flowing from the garden module is filtered and directed to the reservoir module then pumped back to the aquarium module.

20 Claims, 11 Drawing Sheets

(56) References Cited

U.S. PATENT DOCUMENTS

| | | | |
|---|---|---|---|
| 4,026,243 A * | 5/1977 | Jessop, III | A01K 63/003 119/246 |
| 4,035,299 A * | 7/1977 | Vroeginday | A01K 63/04 137/128 |
| 4,211,034 A * | 7/1980 | Piesner | A01G 31/02 47/59 R |
| 4,315,381 A * | 2/1982 | Dvorin | A01G 31/02 47/59 R |
| 4,684,462 A * | 8/1987 | Augustyniak | A01K 63/045 119/260 |
| 4,754,571 A * | 7/1988 | Riechmann | A01G 9/00 47/59 R |
| 4,836,142 A * | 6/1989 | Duback | A01K 63/003 119/255 |
| 4,861,465 A * | 8/1989 | Augustyniak | A01K 63/045 119/227 |
| 5,005,521 A * | 4/1991 | Strong | A01K 63/003 119/257 |
| 5,006,230 A * | 4/1991 | Votava, III | A01K 63/045 119/260 |
| 5,036,618 A * | 8/1991 | Mori | A01G 7/02 47/1.1 |
| 5,040,489 A * | 8/1991 | Drake | A01K 63/006 119/246 |
| 5,042,425 A * | 8/1991 | Frost, Jr. | A01K 31/06 119/246 |
| 5,046,451 A * | 9/1991 | Inslee | A01G 31/02 119/227 |
| 5,054,424 A * | 10/1991 | Sy | A01K 63/045 119/231 |
| 5,056,260 A * | 10/1991 | Sutton | A01G 7/00 47/58.1 R |
| 5,058,529 A * | 10/1991 | Chiu | A01K 63/047 119/263 |
| 5,083,528 A * | 1/1992 | Strong | A01K 63/003 119/225 |
| 5,176,100 A * | 1/1993 | Fujino | A01K 63/04 119/227 |
| 5,469,810 A * | 11/1995 | Chiang | A01K 63/003 119/225 |
| 5,961,831 A * | 10/1999 | Lee | A01K 63/042 119/204 |
| 6,032,613 A * | 3/2000 | Rahman | A01K 63/04 119/231 |
| 6,158,386 A * | 12/2000 | Limcaco | A01K 63/04 119/245 |
| 8,206,579 B1 * | 6/2012 | Shaw | A01K 63/04 119/259 |
| 8,677,942 B2 * | 3/2014 | Bodlovich | C02F 3/32 119/227 |
| 8,738,160 B2 * | 5/2014 | Bucove | A01G 7/045 700/90 |
| 2006/0049086 A1 * | 3/2006 | Axelrod | A01K 63/045 210/167.21 |
| 2009/0050067 A1 * | 2/2009 | Parsons | A01K 61/10 119/200 |
| 2009/0301399 A1 * | 12/2009 | Brown | A01G 31/02 119/226 |
| 2011/0041395 A1 * | 2/2011 | Newbold | A01G 9/18 47/1.4 |
| 2011/0131880 A1 * | 6/2011 | Kloas | A01G 31/02 47/62 R |
| 2011/0297097 A1 * | 12/2011 | Alshammary | A01G 31/00 119/247 |
| 2013/0008386 A1 * | 1/2013 | Jacobs | A01K 63/02 119/217 |
| 2013/0047508 A1 * | 2/2013 | Toone | A01G 31/02 47/62 R |
| 2014/0041594 A1 * | 2/2014 | Plante | A01K 63/003 119/227 |

\* cited by examiner

KIT FOR ASSEMBLING AN AQUARIUM AQUAPONIC ASSEMBLY AND AQUARIUM AQUAPONIC ASSEMBLIES THEREOF

CROSS-REFERENCE TO RELATED APPLICATIONS

The present application is a Continuation-in-part of U.S. patent application Ser. No. 13/962,006, entitled "Aquarium Aquaponic Assembly" and filed at the United States Patent and Trademark Office on Aug. 8, 2013, the content of which is incorporated herein by reference.

FIELD OF THE INVENTION

The present invention generally relates to aquarium aquaponic apparatuses and systems combining traditional aquaculture (raising aquatic species such as fishes, crayfishes, snails or prawns in tanks) with hydroponic culture (cultivating plants in water) in a relatively symbiotic environment.

BACKGROUND OF THE INVENTION

Aquaponics involve the symbiotic integration of plant cultures with the growth of aquatic species. Aquaponic systems are based on the use of aquatic species waste products as nutrients for the plants species. In utilizing the nutrient-rich waste of the aquatic species, the plants somewhat cleanse the circulating water, making it suitable for the aquatic species to survive in.

Although aquaponic systems are known, prior art systems are generally designed for commercial use, for instance, for the culture of tilapia and lettuces.

Still some systems have been designed for outdoor residential uses whereby the sunlight is used as the lighting source.

Still other yet smaller systems have been designed for indoor residential uses. Such systems are generally used as furniture and typically combine an aquarium on the ground level with a garden on top of the aquarium. However, some of the problems with such systems are that it can be difficult to reach the top level components for maintenance and that the location of the aquarium at ground level is generally not desired as it normally results in a less appealing installation.

Accordingly, there is a need for an aquaponic system that is suitably designed for indoor use and which is generally designed in a way that mitigates at least some of the above-mentioned shortcomings.

SUMMARY OF THE INVENTION

Accordingly, a kit for the making of an aquarium aquaponic assembly in accordance with the principles of the present invention generally mitigates at least some of the above-mentioned shortcomings by providing a an aquarium aquaponic assembly in which the garden module is located directly adjacent to one or more sides of the aquarium module in a side by side configuration.

The invention is directed to a kit for assembling an aquarium aquaponic assembly. The kit comprises:
- a reservoir module configured to receive water and having side walls extending from a bottom wall, the side walls having top ends defining a top opening;
- an aquarium module comprising a transparent tank adapted to hold water for housing aquatic species; the transparent tank being supported by the reservoir module and having a bottom wall configured to engage, at least partially, the top opening of the reservoir module and be maintained by the top opening;
- at least one garden module, each garden module being adapted for supporting a plant bed for growing terrestrial plant species, the garden module being also supported by the reservoir module and having a bottom wall configured to engage and be maintained by top opening of the reservoir module;
- a first drain conduit configured to fluidly connecting a top section of the transparent tank of the aquarium module to the garden module;
- a second drain conduit configured to fluidly connecting the garden module to the reservoir module; and
- a pump located into the reservoir module to pump water back to the aquarium module via a third drain conduit configured to fluidly connecting the reservoir module to the aquarium module;

wherein:
- the aquarium module, the garden module, the reservoir module, the first, second and third drain conduits and the pump form a water circulation loop;
- each garden module is located directly adjacent to one side of the aquarium module in a side-by-side configuration, the bottom wall of each garden module being located below an operating water level of the aquarium module such as to receive water therefrom by gravity; and
- the bottom wall of each garden module and the bottom wall of the aquarium module are located in a same plan when engaging the top opening of the reservoir module.

The invention is also directed to an aquarium aquaponic assembly obtained by assembling the kit as defined herein.

aquarium module is generally designed to house and maintain any suitable aquatic species including but not limited to fishes and/or crustaceans. The aquarium aquaponic assembly is typically configured to be mounted on a supporting structure (e.g. a cabinet or a similar piece of furniture) in order to raise the aquarium module and the garden module closer to eye level. Understandably, since the aquarium is often a visually attractive feature in a home, having the aquarium module at a higher level is generally desirable.

Each garden module of the kit is generally configured to support terrestrial and/or semi-aquatic plant species, in particular fine herbs that can be used for cooking. In that sense, the garden module typically is configured to comprise one or more plant beds containing a substrate made from suitable porous substrate material.

Each garden module of the kit supporting a plant bed is adapted to be located directly adjacent to one or more sides of the aquarium module in a side-by-side configuration. Depending on the shape of the aquarium module, the plant bed could possibly partially or even completely surround the aquarium module. The garden module could also comprise several plant beds, for instance, one on each side of the aquarium module.

The garden module of the kit is further configured to receive waste (or return) water flowing from the aquarium module. In that sense, the waste water could flow from the aquarium module toward the garden module actively (e.g. by pumps) or passively (e.g. by gravity), or by a combination of both. This waste water, which generally comprises fish waste, food debris and other effluents (hereinafter generally referred to as waste), provide water to the plants located in the plant bed of the garden module and further provides nutrients for the plants. Understandably, by consuming at least a portion of the waste from the waste water, the plants actively contribute to filtering the water and reducing its waste content.

For its part, the reservoir module of the kit is located directly below and supports both the aquarium module and the garden module. The reservoir module is designed to receive the excess water from the garden module. The reservoir module is also typically configured to further process the water. This additional processing typically includes further filtering the water, heating/cooling the water, and pumping the water back to the aquarium module.

The kit in accordance with the principles of the present invention includes the three main modules (aquarium, garden, reservoir), the water piping system or drains fluidly interconnecting them, and a pump to form a substantially closed water circulation loop in which water flows from the aquarium module into the garden module where the water irrigates the plants and is at least partially filtered by them. Then, water flows from the garden module to the reservoir module where the water is being further processed (if and/or when necessary), and which is then pumped back into the aquarium module.

As such, the invention is also directed to an aquarium aquaponic assembly formed by assembling the modules of the kit. The assembly will generally be either in a transient state or in a substantially steady state.

When the aquarium aquaponic assembly is in a transient state, that is when there are significant changes either in the aquarium module (e.g. fishes are added or removed), in the garden module (e.g. plants are growing, added, or removed), or both, the water circulating between the various modules may need additional processing (e.g. filtration, chemical treatments, etc.) to lower the waste content of the water at a suitable level while the system reaches an equilibrium in which the plants consume most of the waste from the water flowing from the aquarium module.

When the aquarium aquaponic assembly reaches the equilibrium, if no significant changes occur in the aquarium module, in the garden module, or in both, the aquarium aquaponic assembly reaches a substantially steady state. When the aquarium aquaponic assembly is in steady state, the plants of the garden module generally remove most of the waste from water flowing from the aquarium module.

When the aquarium aquaponic assembly is in steady state, the aquarium module requires significantly less water changes.

In typical yet non-limitative embodiments, the garden module comprises a bell siphon which regularly drains the plant bed(s) in order to provide air (e.g. oxygen) to the roots of the plants and substrate. In such embodiments, the cover of the bell siphon could be provided with a small aperture (e.g. pin hole) to reduce suction noise when the bell siphon drains the plant bed(s).

In typical yet non-limitative embodiments, the kit for assembling an aquarium aquaponic assembly further comprises additional water processing equipments and devices (e.g. filter(s), bubbler(s), skimmer(s), siphon(s), etc.) that can be integrated at various locations in the modules and/or in the piping system in order to control, vary and/or modulate the characteristics and/or content of the water in accordance with the needs of the fishes and/or of the plants.

In typical yet non-limitative embodiments, the kit for assembling an aquarium aquaponic assembly further comprises a lighting system configured to provide suitable light to both the aquatic species located in the aquarium module and to the plant species located in the garden module.

In typical yet non-limitative embodiments, the aquarium aquaponic assembly may use fresh water. Still, in some embodiments, the aquarium aquaponic assembly could be used with salt water.

In accordance with the principles of the present invention, several benefits can be obtained by having the plant bed(s) of each garden module below the operating water level of the aquarium module and directly adjacent to one or more sides of the aquarium module. For instance, in such an aquarium aquaponic assembly configuration, both the aquarium module and the garden module will be more visually appealing as opposed to prior art systems in which the garden module is located on top of the aquarium module. In addition, the size of the plant bed or beds will not be limited to the size of the area of the aquarium module, allowing the installation of plant bed or beds having an area larger than the area of the aquarium module. Furthermore, access to the fishes, to the plants and to the various utilities is generally easier.

Also, when the kit in accordance with the present invention is installed indoor, an additional benefit is the temperature control that is provided by an indoor environment. As such, the relative consistency of the temperature is typically governed by the indoor temperatures of the residential space. Further, an indoor installation generally provides an environment free from damaging insects.

Accordingly, having the garden module lower than the predetermined operating water level of the aquarium module and directly beside the aquarium module will at least mitigate a limitation of some prior art systems wherein the garden module was located above the aquarium module with the plant roots extending inside it. In such systems, the size of the garden module was limited to the size of the aquarium module.

The side-by-side configuration of the aquarium module and the garden module in accordance with the principles of the present invention also separates both living environments (plants and fish), thereby generally resulting in a better visual display of both the aquarium module and the garden module.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel aquaponic system will be described hereinafter. Although the invention is described in terms of specific embodiments, it is understood that the embodiments described herein are by way of example only and that the scope of the invention is not intended to be limited thereby.

Figure 1:
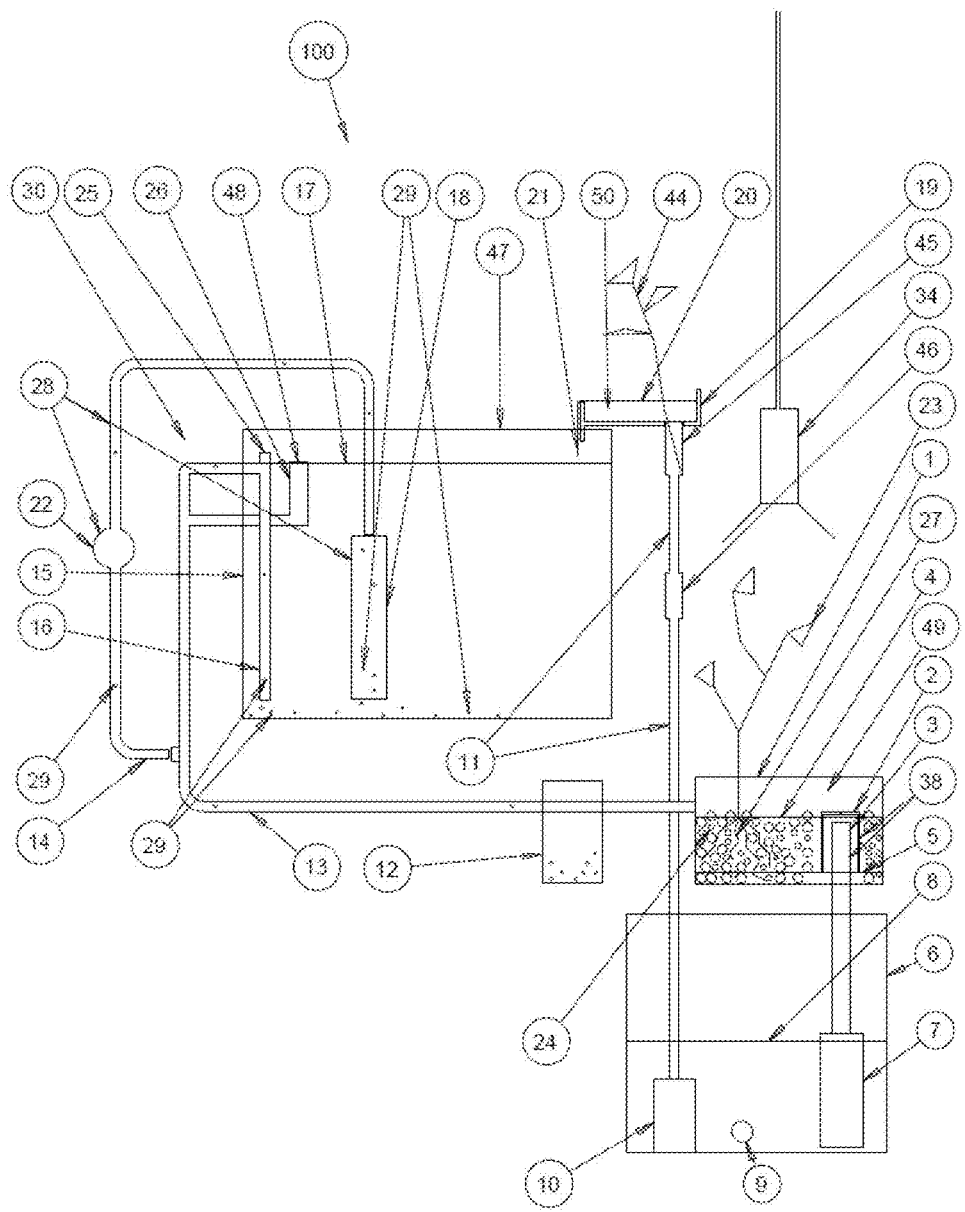
FIG. 1 is a schematic view of an embodiment of an aquaponic system in accordance with the principles of the present invention.

Referring to FIG. 1, a functional diagram of an embodiment of an aquaponic system 100 in accordance with the principles of the present invention is illustrated. The aquaponic system 100 generally comprises an aquarium module 15, a garden module 1, and a water reservoir module 6. It is understood that for the sake of clarity, some structures have been omitted (e.g. the supporting structure under the aquarium module).

The three modules are further fluidly interconnected via various conduits (e.g. pipes) including first drain pipe 13 between the aquarium module 15 and the garden module 1, second drain pipe 3 between the garden module 1 and the reservoir module 6, and return pipe 11 between the reservoir module 6 and the aquarium module 15. It will be appreciated that the modules and various conduits (or pipes) interconnecting them form a water circulation loop in which water circulates between the modules.

Understandably, though the present embodiment of the aquaponic system 100 comprises only one of each pipe, other embodiments could comprise more than one of each pipe. For instance, an embodiment of the aquaponic system 100 could comprise two distinct garden modules 6, one on each side of the aquarium module 15. In such an embodiment, there would be two first drain pipes 13, and two second drain pipes 3.

In the present embodiment, referring to FIG. 1, the aquarium module 15 generally comprises a transparent water tank 47 that is generally designed to house and support any suitable aquatic species including but not limited to fishes and/or crustaceans. The aquarium module 15 also comprises a water drain tube 16 connected to the first drain pipe 13. The drain tube 16 is generally configured to continuously draw waste water from the aquarium module 15, that is water containing waste products 29 (e.g. animal waste, food debris, dirt, etc.), and to drain it by gravity toward the garden module 1 via the first drain pipe 13 which extends between the aquarium module 15 and the garden module 1 and below the aquarium operating water level 17.

In the present embodiment, the drain tube 16 is a stand tube 16 connected to the first drain pipe 13. In other embodiments, the drain tube 16 could be configured differently (e.g. a tube mounted to one of the panels of the aquarium module 15).

The aquarium module 15 also comprises a skimmer 26 which is also connected to the first drain pipe 13. The skimmer 26 is generally configured to continuously collect the top layer of water located in the aquarium module 15 and direct it toward the garden module 15 via the first drain pipe 13. Notably, this top layer generally contains foam and other floating waste products 29. Understandably, the skimmer 26 is typically positioned in the water tank 47 such that its top opening 48 is located substantially at the same level as the operating water level 17 of the aquarium module 15.

In the present embodiment, the first drain pipe 13 comprises inwardly extending protrusions to break the flow of waste water such as to force waste water and air to mix.

The first drain pipe 13, the drain tube 16 and the skimmer 26 generally form the aquarium module water return system 30.

In the present embodiment, the drain tube 16 comprises a top opening 25 configured to extend above the operating waterline 17. This opening 25 can be added to prevent overflowing of the aquarium module 15 in cases where the bottom drain 16 and the skimmer 26 both get clogged. Such an opening 25 would typically act as a failsafe whereby the water would rise until it reaches the overflow opening 25 and then drain back to the first drain pipe 13 thereby avoiding water spilling outside of the aquarium module 15. Understandably, in other embodiments, the drain tube 16 could be devoid of such an overflow opening 25.

As shown in FIG. 1, in the present embodiment of the aquaponic system 100, the first drain pipe 13 that carries the waste water from the aquarium module 15 to the garden module 1 comprises a filter 12. This filter 12 is generally configured to remove at least a portion of the waste products 29 contained in the waste water, typically the largest ones. Still, in other embodiment, this filter 12 could be absent if, for instance, the waste content of the waste water is less important or if the waste products 29 are smaller.

For its part, the garden module 1 is generally located below the operating water level 17 of the aquarium module 15 such that waste water can naturally (e.g. by gravity) flow to it from the aquarium module 15. In the present embodiment, the garden module 1 is also located substantially adjacent to the aquarium module 15.

The garden module 1 generally comprises one or more plant beds 49, each being configured to support terrestrial and/or semi-aquatic plants 23. In FIG. 1, only one plant bed 49 is shown for clarity. In order to properly support the plants 23, the plant bed 49 comprises a substrate 24. In the present embodiment, the substrate 24 is made from beads of various sizes made from porous material such as ceramic beads, sintered glass beads or terracotta beads. Though other substrates could be use, a substrate 24 made from beads of various sizes allows water to flow through it while providing proper support for the roots 27 of the plants 23. In addition, as it will be best understood below, a substrate made from porous material generally allows beneficial bacteria to grow on it.

To allow the water flowing through the garden module 1 to ultimately exit and flow toward the reservoir module 6, the garden module 1 comprises a draining system connected to the second drain pipe 3. In the present embodiment, the draining system is a bell siphon 38 which comprises a cap 2 mounted to the top opening 41 (see FIG. 2) of the second drain pipe 3 which is fluidly connected to the reservoir module 6 as shown in FIG. 1.

The bell siphon 38 is configured to automatically regularly substantially drain the plant bed 49 in order to aerate the roots 27 of the plants 23 and to oxygenate the bacteria growing on the substrate 24. In that sense, as shown in FIG. 1 and also in FIG. 2, the bell siphon 38 will activate and drain the plant bed 49 when the water level in the plant bed 49 reaches first (e.g. high) level 4, which generally correspond to the height of the top opening 41 of the second drain pipe 3. The siphon action will engage and start to drain the water from the garden module 1 when water starts to pour inside the opening 41 of the drain pipe 3 with sufficient velocity. When the bell siphon 38 activates, it will drain the plant bed 49 until the water level in the plant bed 49 reaches a second (e.g. low) level 5 which is understandably lower than the first level 4 and which generally corresponds to the height of the lower opening 42 of the cap 2 of the bell siphon 38. Understandably, the first and second water levels in the plant bed 49 are generally determined by the configuration of the bell siphon 38.

Though in other embodiments the draining system of the garden module 1 could be different from a bell siphon 38, it remains that the bell siphon 38 provides benefits that other draining systems might not provide. For instance, the bell siphon 38 will allow the water level in the plant bed to regularly drop, thereby exposing the roots 27 of the plants 23 and the bacteria growing on the substrate 24 to ambient air, and providing them with more oxygen.

Figure 2:
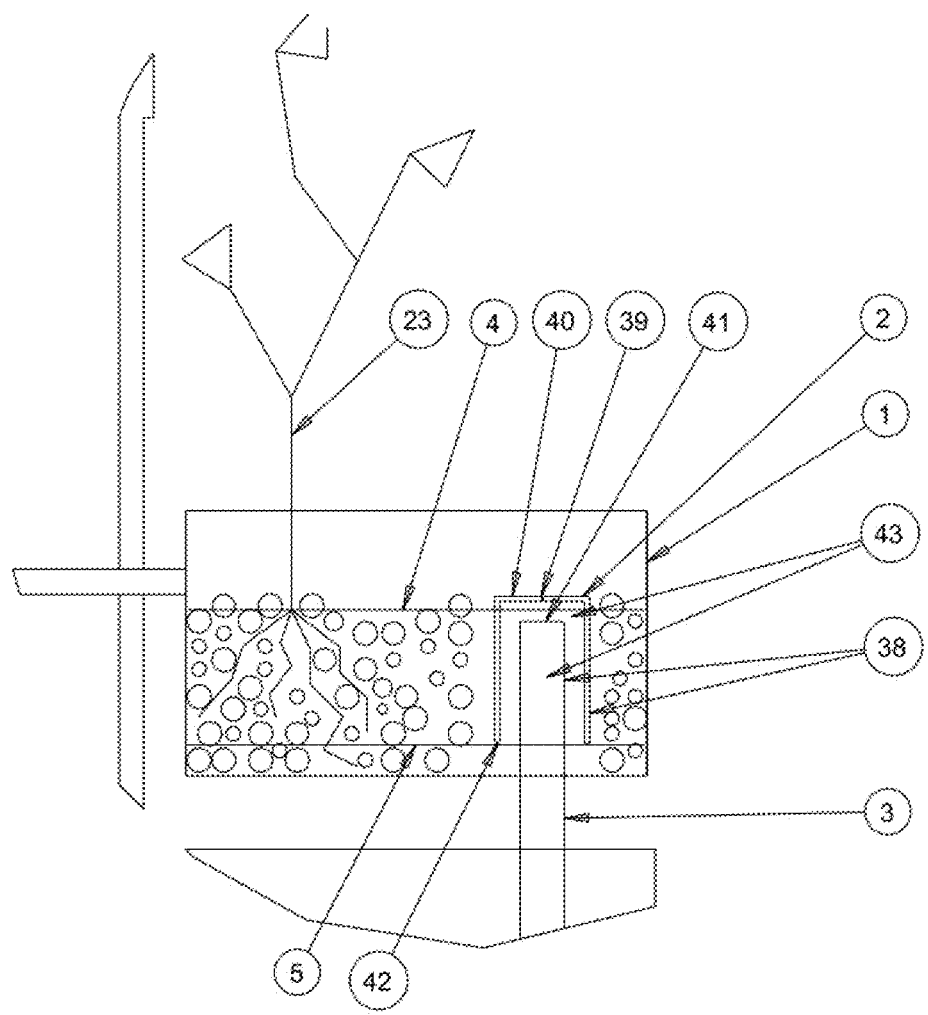
FIG. 2 is a detailed schematic view of the bell siphon area of the aquaponic system of FIG. 1.

With additional reference to FIG. 2, in the present embodiment, the bell siphon cover 2 is provided with at least one small aperture 39 (e.g. a pin hole). By placing an aperture 39 through the top surface 40 of the cover 2 (in a standard bell siphon, the cover 2 is sealed), air will be introduced through this aperture 39 slowly and gradually inside the siphon chamber 43 during the siphon pulling action. This will reduce its pulling action as more air fills the siphon chamber 43 until it slowly dissipates the siphon action completely and silently. The aperture 39 thus reduces noises since there is no air rushing inside the chamber 43 from the bottom opening of the cover 42 like most conventional bell siphons (including those with a side air intake pipe extending from the cover of the siphon down to the low water line) and inside the chamber Understandably, since the aquaponic system 100 is generally intended to be used in residential and/or commercial areas (e.g. boutiques, restaurants, etc.) where people are present, reducing unwanted suction noise is generally desirable. Still, if the aquaponic system 100 is to be used in an already noisy environment, the aperture 39 in the cap 2 could be absent.

The aperture 39 could also be calibrated to have the siphon action dissipates at a water level between the first water level 4 and the second water level 5 inside the garden module 1. By having a larger aperture 39, the siphon action will break in less time as more air will infiltrate the siphon chamber 43 until it gradually dissipates. Optimally for this aquaponic system, the aperture 39 needs to be calibrated smaller so the water drains the entire plant bed 49 or at the bottom opening of the cover 42 where the water intakes. This is also the lowest (or maximum) draining level before air enters the siphon chamber 43 through this opening 42 and makes suction noise.

Although in the present embodiment water fluctuation is desirable in order to oxygenate the plant roots 27, different plant species could as well require that a fix amount of water be sustained. As such, the cover 2 could possibly be removed to maintain the water level unchanged (i.e. at the first water level 4). Accordingly, removal of the cover 2 will result in discharging of the excess water through the second drain pipe 3 and into the reservoir module 6.

Referring back to FIG. 1, the reservoir module 6 is typically located at a level below the garden module 1. This allows the water draining from the garden module 1 to naturally (e.g. by gravity) flow into the reservoir module 6 via the second drain pipe 3.

The reservoir module 6 is generally configured to hold the excess water from the aquaponic system 100 and to pump it back to the aquarium module 15 to maintain the circulation of water in the water circulation loop. In that sense, the reservoir module 6 generally comprises at least a pump 10 which is connected to the return pipe 11. Pump 10 pumps back the water held in the reservoir module 6 to the aquarium module 15 via the pipe 11.

The reservoir module 6 is also generally configured to further process the water, if necessary, before returning it to the aquarium module 15. For instance, in the present embodiment, the reservoir module 6 comprises a filter 7 mounted at the end of the second drain pipe 3, and a water heater (or cooler) 9 located in the reservoir module 6. Understandably, in other embodiments, there could be no additional filter 7 and/or water heater (cooler) 9 if such components are not necessary. In still other embodiments, there could be additional water processing components such as, but not limited to, skimmer, bubbler, $CO_2$ diffuser, auto top off (to maintain a certain water level 8), water level indicator, UV light sterilizer, etc.

Still, in the present embodiment, the filter 7 is generally configured to filter out at least a portion of the waste products 29 that have passed through the garden module 1. In that sense, when water is discharged at relatively high velocity from the plant bed 49 via the bell siphon 38, accumulated particles from the plant bed 49 will be pulled through bell siphon and drained toward the reservoir module 6. Hence, the filter 7 will filter these particles before they enter the reservoir module 6. The filter 7 therefore prevents particles from being pumped back into the aquarium module 15. Understandably, it is desirable to have clean water for the fishes but also for better visual appreciation.

For its part, the water heater 9 is configured to heat the water to a temperature suitable for the aquatic species living in the aquarium module 15 and for the plant species living in the garden module 1. Understandably, if the aquaponic system 100 is to be used in an already hot environment, the water heater 9 could be replaced by a water cooler which will cool the water to a temperature suitable for the aquatic species living in the aquarium module 15 and for the plant species living in the garden module 1. Though not shown in the figures, a temperature sensor would generally be installed in the reservoir module 6 or in the aquarium module 15 to sense the temperature of the water and turn on or off the water heater (or cooler) 9 as needed.

As mentioned above, the pump 10 of the reservoir module 6 is configured to pump back water to the aquarium module 15 via the return pipe 11.

In the present embodiment, the return pipe 11 is provided with dampening regions 45, 46. These dampening regions 45, 46 provide a water damper area for reducing the speed of the water during start up of the pump 10 and for preventing water from being ejected at the top extremity of the return pipe 11. These dampening regions 45, 46 are regions having a larger inner cross-sectional area than the nominal inner cross-sectional area of the return pipe 11. When the water coming up the return pipe 11 crosses these regions, the water flow slows down and the water fills the enlarged regions. These dampening portions 45, 46 of the return pipe 11 can be positioned at any level along it as shown in FIG. 1. Understandably, though two dampening regions 45, 46 are shown, only one dampening region 45 or 46 is typically necessary to provide a water damper.

Understandably, depending on the exact configuration of the return pipe 11, it could be provided with dampening regions 45, 46 having different configurations or be devoid of dampening regions 45, 46 altogether.

In the present embodiment, the top extremity of the return pipe 11 is fluidly connected to a waterfall structure 19 comprising a water basin 50. The waterfall structure 19 is configured to let water fall into the aquarium module 15 when the water overfills the basin 50 (when the water reach the water level 20 in FIG. 1). While most prior art systems use air pumps or other type of aerating devices, in the present embodiment, the waterfall 21 aerates the water as the falling water creates natural air bubbles in the water and as such, oxygenates the water of the aquarium module 15. This continuous oxygenation provides oxygen to fishes, plants and bacteria responsible for the break down of aquarium waste product into plant nutrients. Though the waterfall structure 19 could be configured otherwise, it remains that having the returning water falling into the water of the aquarium module 15 is beneficial.

Notably, in the present embodiment, the pump 10 functions continuously such that the waterfall 21 provides a constant water flow to the aquarium module 15.

In addition, depending on its configuration, the waterfall structure 19 can provide an aurally and visually aesthetically pleasing environment. In that sense, in the present embodiment, the return pipe 11 comprises a dampening region 45 at the junction with the waterfall structure 19. When the dampening region 45 is positioned directly underneath the waterfall structure 19, it provides a larger port opening inside the waterfall structure 19. This larger port can serve the purpose of a vase holder for cut flowers 44 to be placed as a decorative feature for an aquarium or water fall. Water being pumped from the reservoir 6 provides continuous water flow to the flowers, thereby avoiding premature rotting of the cut area of the flower stem and generally prolonging the life of the cut flowers compared to stagnant water from a conventional vase with non-moving or replenishing water.

As mentioned above, the three modules and the various pipes (or conduits) interconnecting them form a water circulation loop in which water flows from the aquarium module 15 to the garden module 1, then from the garden module 1 to the reservoir module 6, and then from the reservoir module 6 back to the aquarium module 15.

In accordance with the principles of the present invention, this water circulation loop allows waste products 29 of the aquarium module 15 to be processed and consumed by the plants 23 (and bacteria) growing in the garden module 1. As the plants 23 (and bacteria) growing in the garden module 1 consume the waste products 29, the water is substantially cleansed and the aquaponic system 100 requires less water changes.

So, in use, the aquarium module 15 will house and support aquatic animal species such as, but not limited to, fishes, crustaceans and/or molluscs. These aquatic animal species will generate waste products 29. These waste products 29, plus any other waste products 29 such as food debris, will either float to the surface or sink to the bottom.

As this point, the drain tube 16 will capture falling food debris and fish waste products 29 while the skimmer 26 will collect the top layer of the water, top layer which generally comprises floating waste products 29 in addition to any floating residues (e.g. foam, oils, etc.).

The waste products 29 collected by the drain tube 16 and the skimmer 26 will flow toward the garden module 15 via the first drain pipe 13. In the present embodiment, the filter 12 will filter out at least a portion of the waste products 29. Notably, the incorporation of a mechanical filter 12 prior to the water entry of the garden module 1 enables the capture of larger waste debris 29 before entering the plant substrate 24 where aerobic bacteria grow.

As the water containing the waste products 29 reaches the garden module 1, it will irrigate the roots 27 of the plants 23. Also, at least a portion of the waste products 29 will get trapped in the substrate 24, allowing the bacteria growing in it to break down and/or metabolize them in small components that can be consumed as nutrient by the plants 23. Other waste products 29 could be directly consumed by the plants 23. Understandably, as the plants 23 consume the waste products 29, these waste products 29 are removed from the water, effectively cleansing it.

For instance, one of the main waste products 29 generated by the aquarium module 15 is ammonia. Though ammonia is toxic for the aquatic species, it is a source of nitrogen which is an essential nutrient for the plants 23. As such, the bacteria responsible to break down ammonia will feed on the fish waste and overfeeding and provide necessary nutrients for the plants 23. As the plants 23 then consume the ammonia present in the water, they will remove a substance toxic for the aquatic species.

At this point, it is important to note that one of the main benefit of having the garden module 1 mounted beside the aquarium module 15 instead of over it as in prior art systems is that the size of the garden module 1 can be tailored to the size (e.g. volume) of the aquarium module 15 without being limited by the area of the aquarium module 15. Hence, it is possible to design the garden module 1 as large as needed such that there are enough plants 23 to consume most of the waste products 29 of the aquarium module 15.

As the water level in the plant bed 49 rises to the first water level 4 (due to the inflow of waste water coming from the aquarium module 15), the bell siphon 38 will activate and drain the water down to the second (e.g. low) water level 5. As the water level drop to the second water lever 5, the roots 27 of the plants 23 and the bacteria growing on the substrate will be exposed, allowing for their aeration.

When the bell siphon 38 activates, it drains the water to the reservoir module 6 through the second drain pipe 3. In the present embodiment, this water will go through a filter 7 in order to remove waste products 29 that would not have been trapped by the garden module 1.

Water that has accumulated in the reservoir module 6 may be heated or cooled depending on the need of the aquatic species living in the aquarium module 15. The water is then pumped back to the aquarium module 15 by the pump 10 and the return pipe 11.

Due to the dynamic nature of the aquatic species living in the aquarium module 15 and of the plant and bacterial species living in the garden module 1, the aquaponic system 100 can be seen as being in either in a transient state or in a substantially steady state.

When the aquaponic system 100 is in a transient state, that is when there are significant changes either in the aquarium module 15 (e.g. aquatic species are added or removed), in the garden module 1 (e.g. plants 23 are growing, added, or removed), or both, the water circulating between the various modules may need additional processing (e.g. filtration, chemical treatments, etc.) to lower the waste content of the water at a suitable level while the system reaches an equilibrium in which the plants 23 consume most of the waste from the water flowing from the aquarium module 15.

When the system 100 reaches the equilibrium, if no significant changes occur in the aquarium module 15, in the garden module 1, or in both, the aquaponic system 100 reaches a substantially steady state. When the aquaponic system 100 is in steady state, the plants 23 (and the bacteria) growing in the garden module 1 generally remove and consume most of the waste from water flowing from the aquarium module 15.

When the aquaponic system 100 is in steady state, the aquarium module requires significantly less water changes.

Referring to FIG. 1, the aquaponic system 100 could further comprise an aquarium cleaning system 28 typically comprising a third drain pipe 14, a priming hand pump 22 and a cleaning pipe or tube 18 generally used to remove waste and other debris 29 found at the bottom of the aquarium module 15.

In the present embodiment, the aquarium siphon system 28 can be permanently or temporarily connected, via appropriate connectors and/or valves, to the first drain pipe 13, recycling the aquarium waste and debris 29 toxic for the fishes directly to the garden module 1, wherein the waste will be used as nutrient for the plants 23. This function is mainly achievable where the garden module 1 is lower then the operating water level 17 of the aquarium module 15. Notably, in most aquarium environments, waste and overfeeding debris will settle at the bottom of the aquarium thereby not getting through the filtering system. Such waste buildup is toxic for the fish and requires periodic removal. Using the cleaning system 28 will recycle the water while removing the waste build-up from the aquarium module 15 and irrigate the plants 23 in the garden module 1. Consequently, maintenance of the aquarium module 15 is much easier as water changes significantly less required.

In other embodiment, the cleaning system 28 could possibly be connected directly to the garden module 1.

Notably, the siphon cleaning system 28 will work only if the aquarium module 15 is located higher then the garden module 1. In that sense, in most prior art systems, the plant bed is located on top of the aquarium, making it impossible to directly use a siphon cleaning system to pump waste water from the aquarium up to the plant bed. In such prior systems, to use the waste water to irrigate the plant bed requires additional manipulation steps such as discharging the waste water from the siphon cleaning system into a bucket placed lower than the aquarium and then pour it back into the plant bed.

Figure 3:
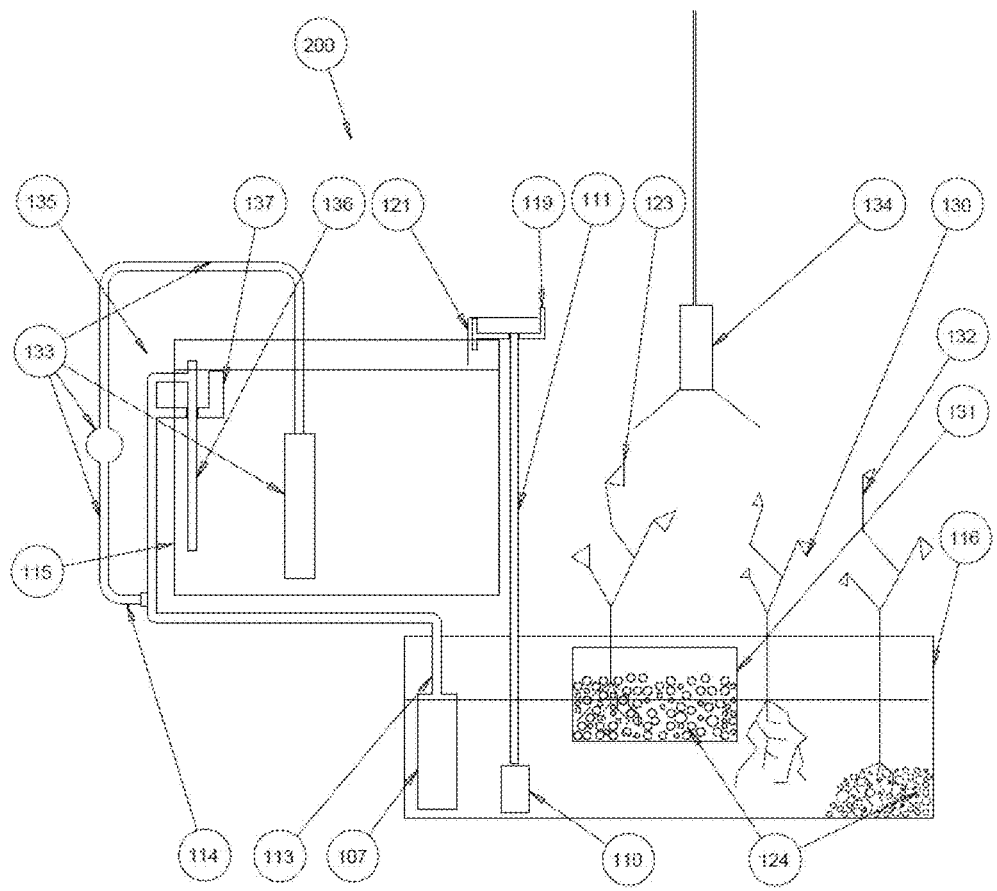
FIG. 3 is a schematic view of another embodiment of an aquaponic system in accordance with the principles of the present invention, wherein the system is specially configured for semi-aquatic plant species.

Referring to FIG. 3, another embodiment of an aquaponic system 200 in accordance with the principles of the present invention is shown wherein the system 200 is designed for semi-aquatic plant species or plants that thrive in water (e.g. lettuces). This embodiment generally comprises an aquarium module 115, a reservoir module 106, and a pump 110.

In the system 200 shown in FIG. 3, the water circulation system 135 typically transfers the water overflow of the aquarium module 115, to the drain tube 136 and/or to the skimmer 137, then through the first drain pipe 113, where it typically goes through a filter 107 located inside the reservoir module 116. The pump 110 at the bottom of the reservoir module 116, will direct the water through the return pipe 111 where it will fill a basin 119 generally located over the aquarium module 115 in order to flow evenly as a waterfall 121 in to the aquarium module 115. Although the present embodiment returns the cleaned water to the aquarium module 115 with the aid of a waterfall 121, a simple return pipe could also be used to return the water inside the aquarium module 115.

In the embodiment of FIG. 3, there is no garden module as in the embodiment of FIG. 1. As such, the plants 123 grow directly into the reservoir module 106. In FIG. 3, three growing methods are shown. In a first method, the plants 123 grow in a perforated plant basket 131 that allows water from the reservoir module 116 to penetrate inside in such a way as to allow contact with the substrate 124 and the plant 123. In a second method, the plants 130 grow directly inside the reservoir module 116. In a third method, the plants 132 grow directly in the reservoir module 116 but on substrate 124 located at the bottom of the reservoir module 116. Although only three ways of growing plants inside the reservoir module 116 are disclosed the embodiment of FIG. 3, more or less than three ways could be used. The common feature of the different methods outlined above is the fact that the reservoir module 116 is positioned at a substantially lower level then the operating water level of the aquarium module 115.

As the aquaponic system 100, the aquaponic system 200 can also comprise a manual siphon cleaning system 133 which can be connected temporarily or permanently to the first drain pipe 113 via appropriate valve or connector 114.

It is well understood in aquaponics that the waste from the aquatic species and overfeeding are the main food source for the plants and that it is beneficial to circulate back the waste through the plant system for symbiotic relationship. Contrary to the conventional aquarium system where the waste must be completely removed in order to not contaminate the fish, aquaponic systems optimise the use of each component for better harvesting and reduced maintenance.

Understandably, an aquaponic system in accordance with the principles of the present invention can be complemented with a timer-controlled growing lighting system 34, 134. Such lighting system 34, 134 would be located above the garden module and would allow the aquaponic system to be located in low lighting environment. Most prior art aquaponic system do not have integrated artificial lighting systems 34, 134. The lack of such lighting system 34, 134 will prevent the installation of aquaponic system in low light areas. In addition, timer-controlled lighting systems permit the harvesting of several crops during the year. Harvesting several crops during the year cannot normally be achieved in fluctuating climates where natural light varies according to the seasons.

Referring now to FIGS. 4 to 9, a kit 300 for assembling an aquarium aquaponic assembly in accordance with a preferred embodiment of the present invention is illustrated.

The kit 300 generally comprises an aquarium module 325, having a predetermined operating water level preferably indicated by a protrusion 290, a garden module 210, a reservoir module 260, a hiding module 220 and preferably a timer-controlling module 230 for preferably controlling lamps 241 of a lighting system 240.

The aquarium module 325 comprises a transparent tank 253 adapted to hold water for housing and supporting aquatic species. The transparent tank 253 comprises a top portion 251 adapted to receive a removable cover 270. The transparent tank 253 is further configured to preferably host a removable container 252 adapted to support aquatic plants. The container 252 can be totally disposed on the bottom wall 254 of the transparent tank 253. The transparent tank 253 is adapted to be supported and removably maintained by the reservoir module 260.

Referring now to FIGS. 4 to 7, the garden module 210, the aquarium module 325 and the reservoir module 260 are disposed in a way that the bottom wall of the garden module 210 is located below the operating water level of the aquarium module 325 and directly adjacent to one or more sides of the aquarium module 325 in a side by side configuration. The garden module 210 comprises a bottom wall 213 located in the same plan as the bottom wall 254 of the transparent tank 253. Both bottom walls 213 and 254 are adapted to removably engage the top opening 261 of the reservoir module 260 located directly below both the aquarium module 325 and the garden module 210.

In a preferred embodiment, the bottom wall 254 of the aquarium module is configured to engage, at least partially, the top opening 261 of the reservoir module 260 and be maintained by the top opening 261.

In a preferred embodiment, the garden module is also supported by the reservoir module 260 in a way that the bottom wall 213 of the garden module is configured to be maintained by the top opening 261 of the reservoir module. As an example, the modules may be slide one in the other using grooves.

Figure 7:
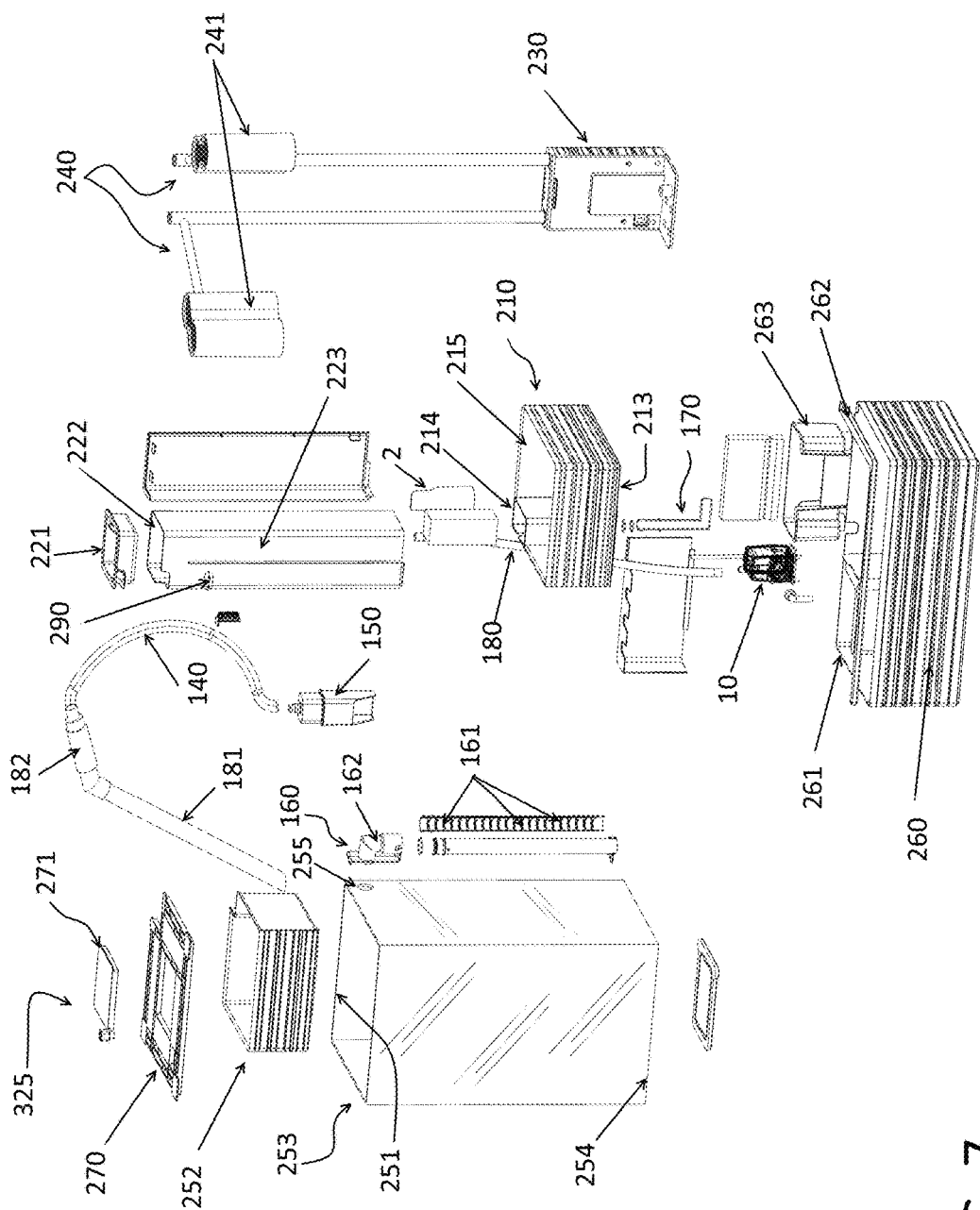
FIG. 7 is a perspective exploded view of the elements and modules forming the kit for an aquarium aquaponic assembly, including a cleaning module, in accordance with a preferred embodiment of the present invention.

Referring further to FIG. 7, the garden module 210, the aquarium module 325 and the reservoir module 260 are fluidly interconnected via various conduits (e.g. pipes) including a first drain conduit 160 connecting the top section 251 of the transparent tank 253 of the aquarium module 325 to the garden module 210, a second drain conduit 170 connecting the garden module 210 to the reservoir module 260, and a third drain 180 connecting a pump 10 located into the reservoir module 260 to the aquarium module 325. The different modules, the pump and various drains are interconnected to form a water circulation loop.

In a preferred embodiment, the first drain conduit 160 comprises a skimmer 162 for connecting the first drain conduit to the top section 251 of the transparent tank 253 via an opening 255 located on the top side of the aquarium tank 253. The skimmer 162 allows to collect a top layer of water located in the transparent tank and to direct it toward the garden module.

In a preferred embodiment, the kit may further comprise a hiding module 220 adapted to engage a side wall of the transparent tank 253 adjacent to the garden module. The hiding module 220 is further adapted to rest partially inside the aquarium module 325 and partially outside the aquarium module in a way to be adjacent to the garden module 210. The hiding module 220 is configured to hide at least the different piping conduits or drains 160, 170 and 180.

Figure 4:
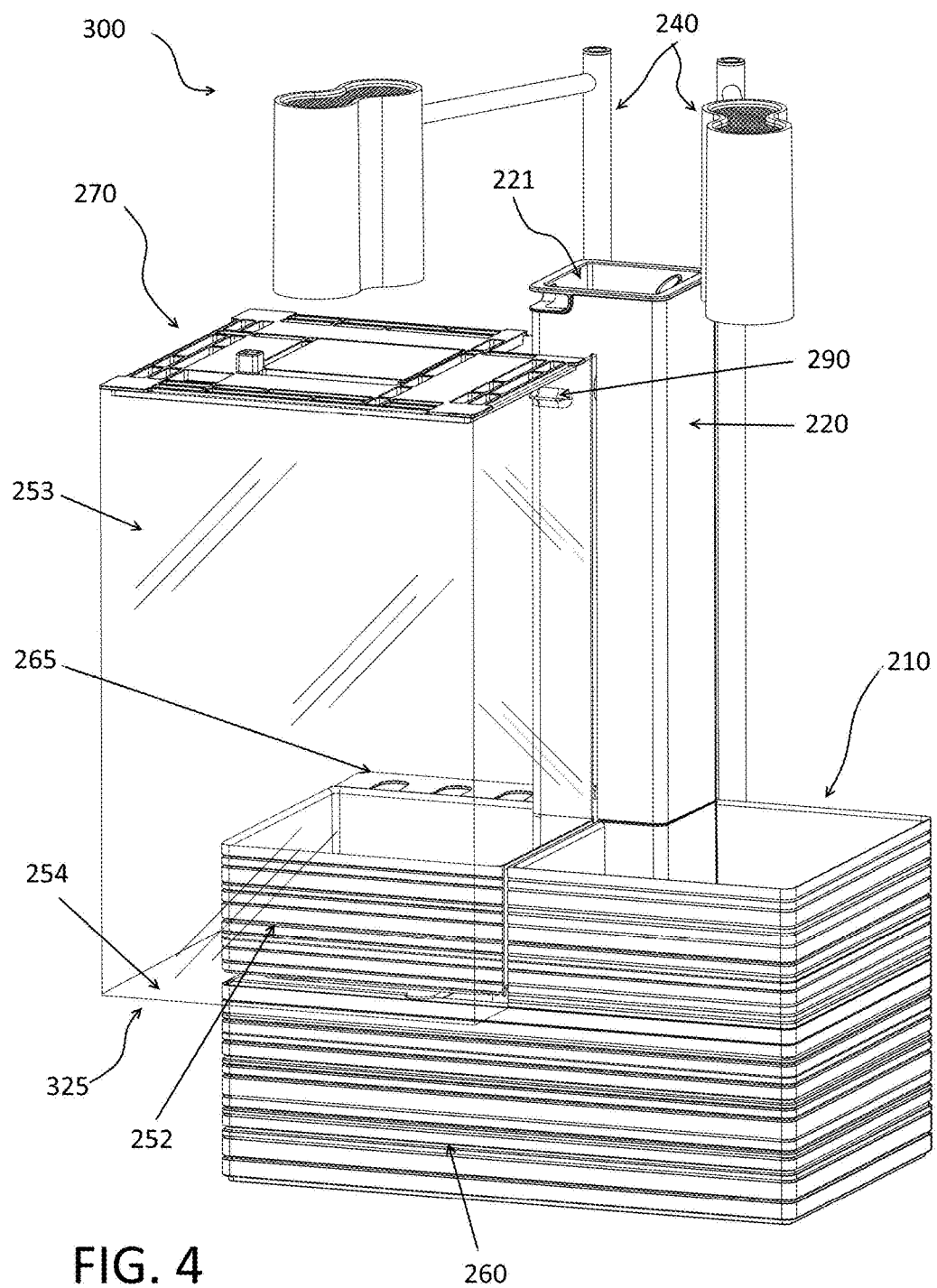
FIG. 4 is a perspective view of the assembled kit for an aquarium aquaponic assembly in accordance with a preferred embodiment of the present invention.

Referring to FIG. 4, the hiding module has a surface 223 comprising a protrusion 290 extending from the surface inside the transparent tank 253. The protrusion 290 defines the operating water level of the aquarium module 325.

Understandably, though the present embodiment of the kit 300 comprises only one of each conduit, other embodiments could comprise more than one of each conduit.

In another embodiment, the kit 300 could comprise two or more garden modules 210, one on each side of the aquarium module 325. In such an embodiment, there would be at least two first drain conduits 160, and two second drain conduits 170.

Referring now to FIG. 7, the transparent tank comprises an opening 255 communicating with the first water drain conduit 160. The opening 255 corresponds to the predetermined operating water level of the aquarium module that is identified on the hiding module by the protrusion 290 once the hiding module 220 is in place. The first drain conduit 160 is generally configured to continuously draw water containing waste products from the aquarium module 325, and to drain it by gravity toward the garden module 210. The first drain 160 is adapted to rest inside the hiding module 220 and extends between a predetermined operating water level of the aquarium module 325 and the garden module 210.

In a preferred embodiment, as shown on FIG. 7, the first drain conduit 160 comprises inwardly extending protrusions 161 to break the flow of waste water such as to force waste water and air to mix.

In a preferred embodiment, the first drain conduit 160 communicates with a filter located in a draining system 214, and configured to remove at least a portion of the waste products contained in the water drained from the aquarium module 325 before entering the garden module.

Figure 8:
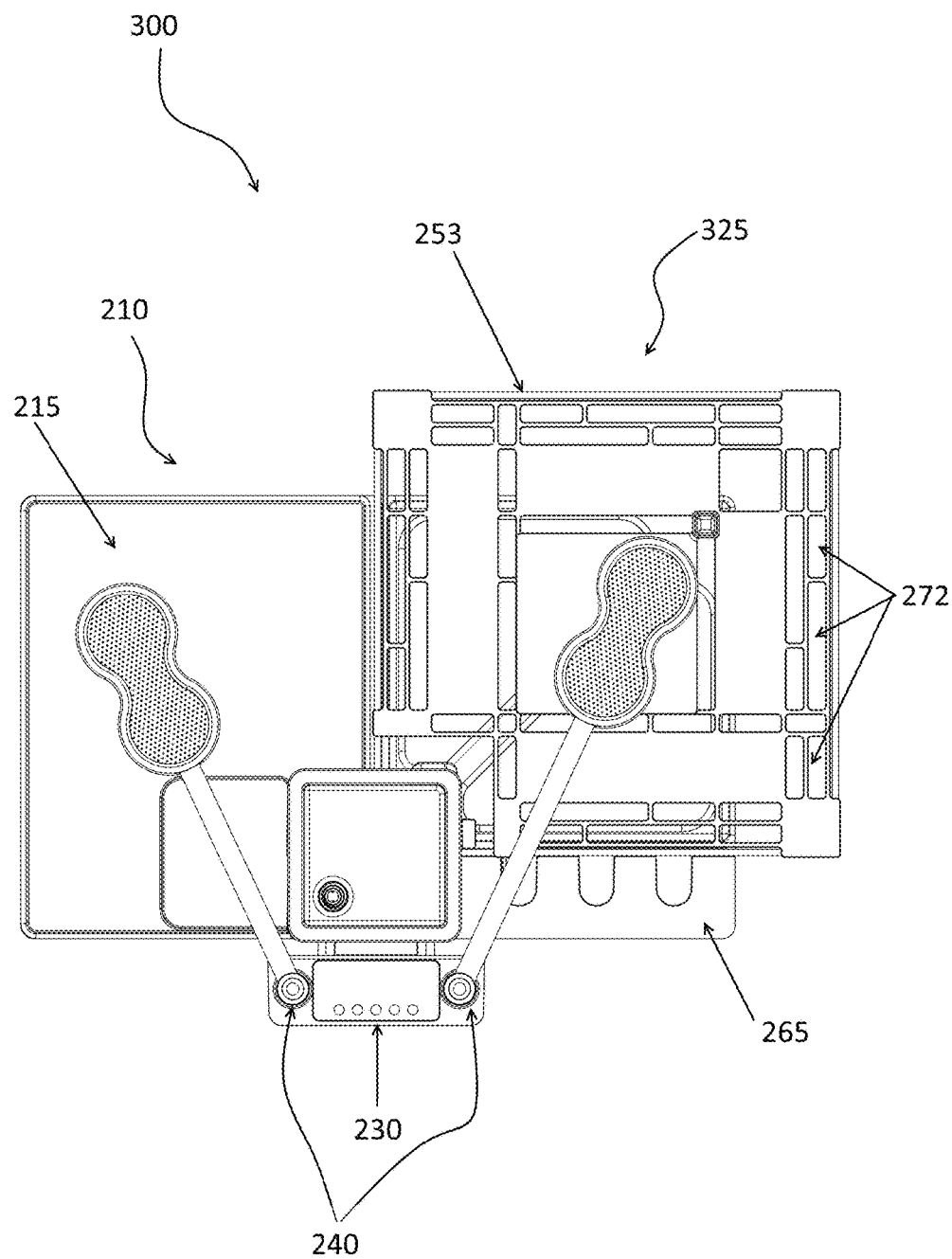
FIG. 8 is a top view of the kit for an aquarium aquaponic assembly illustrated on FIG. 4.

Referring to FIGS. 7 and 8, the cover 270 removably attached to the top portion 251 of the transparent tank 253 is adapted to keep the transparent tank close to avoid any undesirable accidents. The cover 270 comprises different openings 272 allowing the air to penetrate to the transparent tank while the major surface of the tank 253 remains close. The cover 270 further comprises a removable part 271 offering an easy access to the transparent tank while the major surface of the tank 253 remains close.

Figure 5:
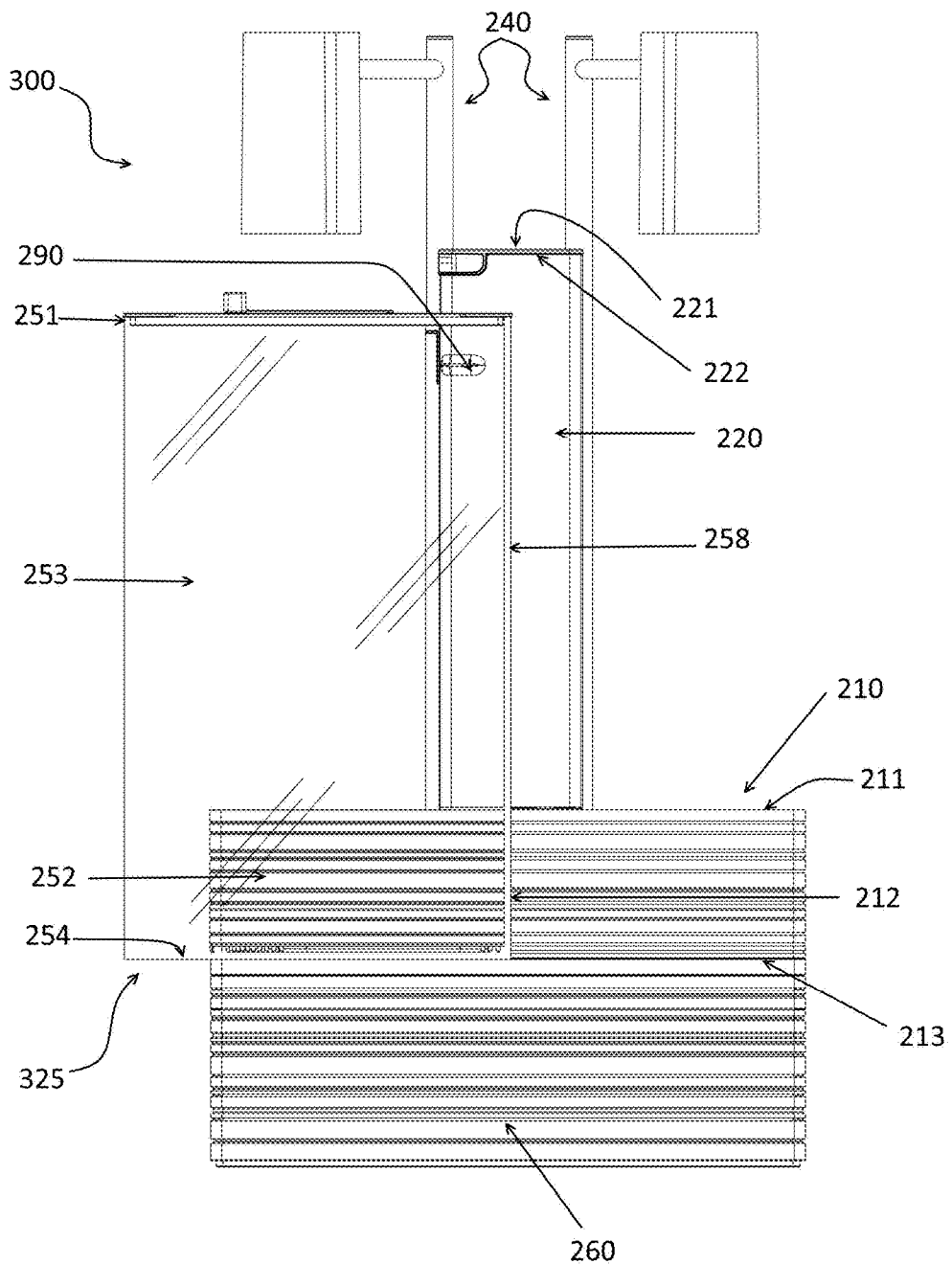
FIG. 5 is a front view of the kit for an aquarium aquaponic assembly illustrated on FIG. 4.
Figure 6:
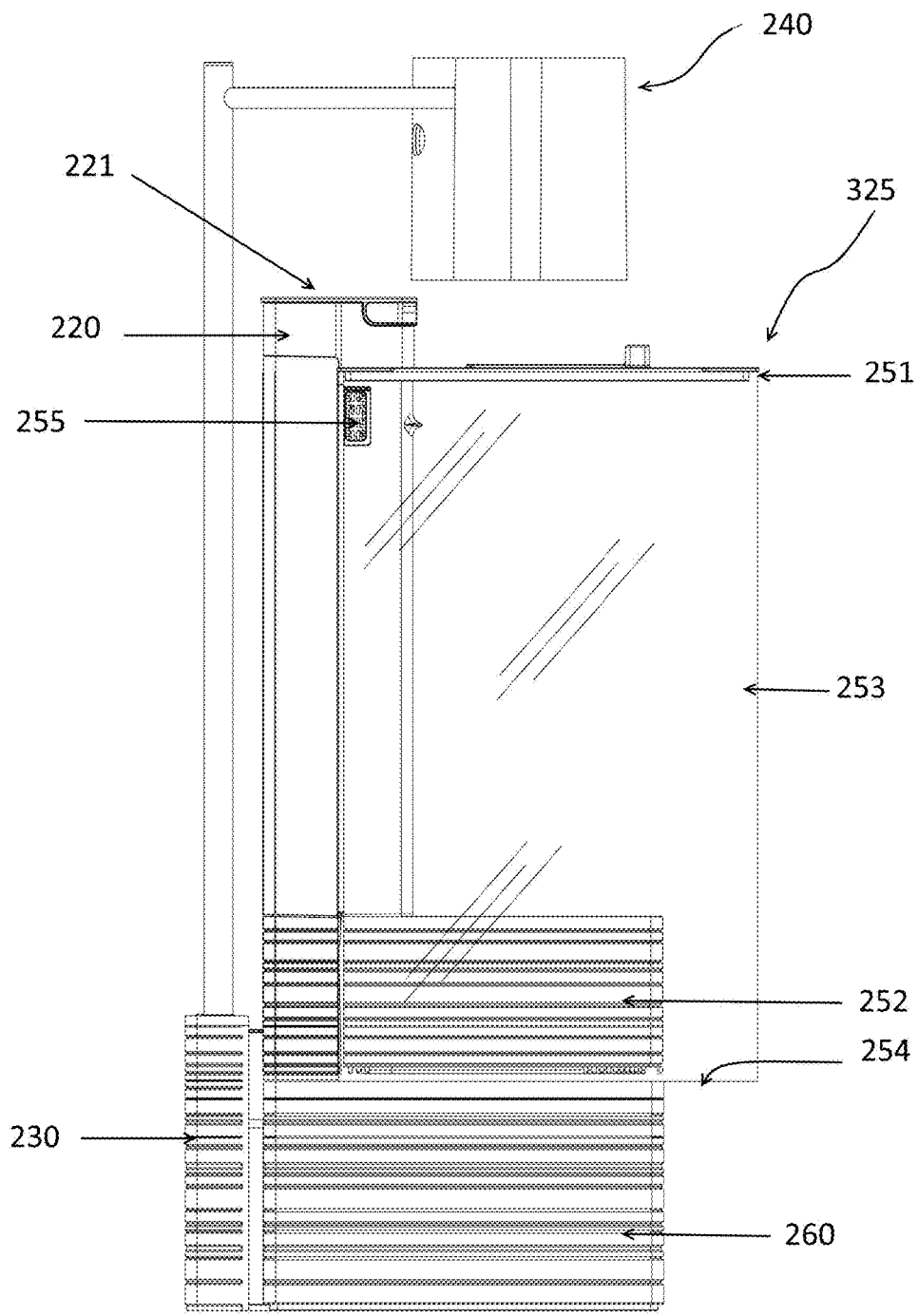
FIG. 6 is a left side view of the kit for an aquarium aquaponic assembly illustrated on FIG. 4.

Referring now to FIGS. 5 and 7, for its part, the garden module 210 generally comprises one or more plant beds 215 for growing terrestrial plant species. In FIGS. 4 to 9, only one plant bed 215 is shown for clarity. The garden module further comprises a filter 214 configured to first remove at least a portion of the waste products contained in the water drained from the aquarium module 325 to the garden module 210 and to secondly filter the water drained from the garden module 210 to the reservoir module 260.

Figure 10:
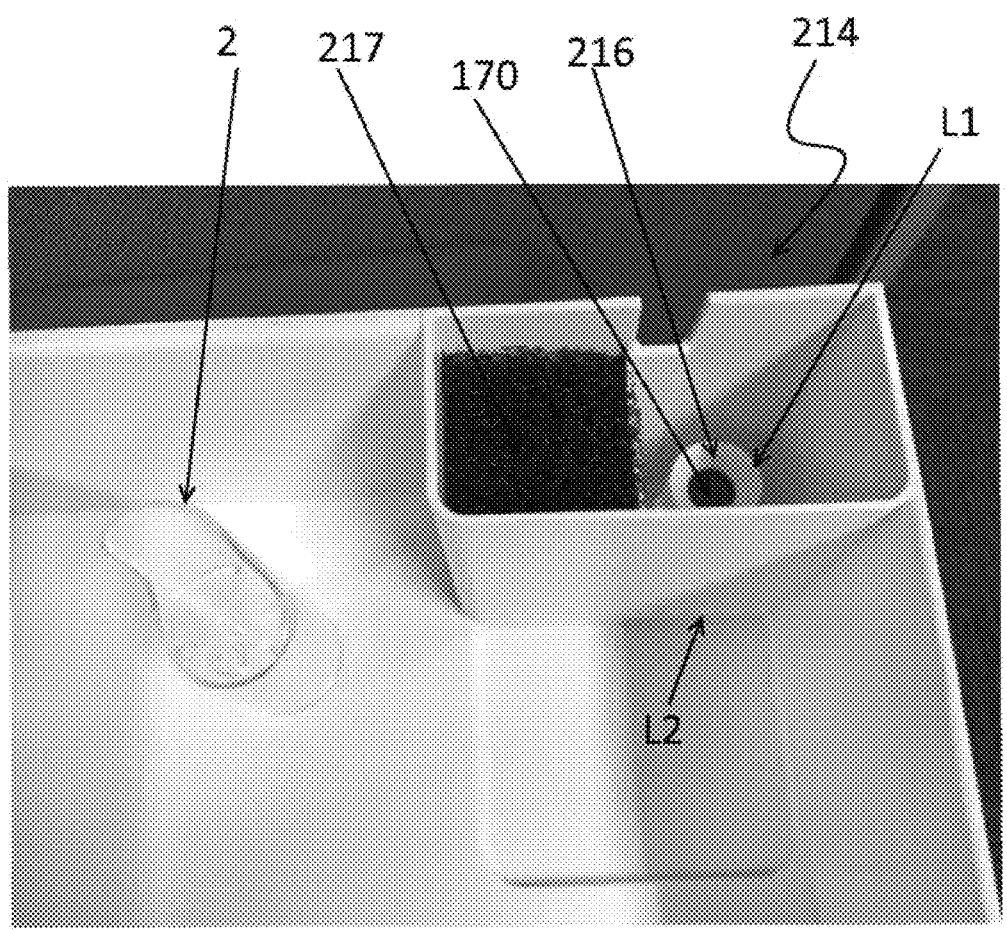
FIG. 10 is a picture showing the draining system according to with a preferred embodiment of the present invention.
Figure 11:
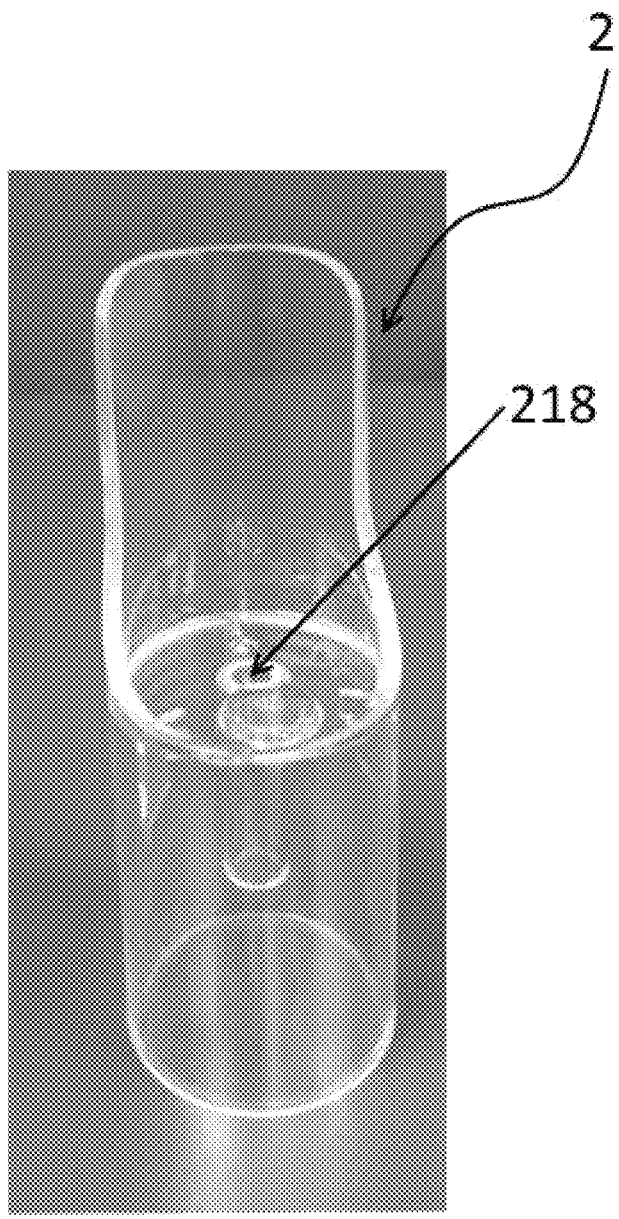
FIG. 11 is a picture showing the cap of the draining system according to with a preferred embodiment of the present invention.

A illustrated on FIGS. 10 and 11, to allow the water flowing through the garden module 210 to ultimately exit and flow toward the reservoir module 260, the garden module 210 comprises a draining system 214 connected to the first drain conduit via a filter 217, and to the second drain conduit 170 via a bell siphon 216. In the present embodiment, the draining system further comprises a cap 2 adapted to be mounted on the bell siphon 216 and cover the top opening of the belle siphon and the second drain conduit 170 which is fluidly connected to the reservoir module 260.

In a preferred embodiment, the bell siphon is configured to regularly drain the plant bed 215 in order to aerate the roots of the plants. In that sense, the bell siphon will activate and drain the plant bed 215 when the water level in the plant bed 215 reaches a first level L1 which generally corresponds to the height of the top opening of the second drain conduit 170. The siphon action will engage and start to drain the water from the garden module 210 when water starts to pour inside the opening of the second drain conduit 170 with sufficient velocity. When the bell siphon activates, it will drain the plant bed 215 until the water level in the plant bed 215 reaches a second level L2 which is understandably lower than the first level and which generally corresponds to the height of a lower opening of the cap 2 of the bell siphon. Understandably, the first and second water levels in the plant bed 215 are generally determined by the configuration of the bell siphon.

In a preferred embodiment, the bell siphon cover 2 is provided with at least one small aperture placed through the top surface of the cover 2. Such a configuration will reduce the pulling action of the bell siphon as more air fills the siphon chamber and until the siphon action is completely and silently dissipated.

In a preferred embodiment, the aperture 218 on the top surface of the cover 2 is configured to allow the air to flow in the bell siphon and adapted to properly dissipate the water inside the garden module 210 while reducing suction noise.

In another embodiment, the cover 2 could possibly be removed to maintain the water level unchanged. Accordingly, such a configuration results in discharging of the excess water through the second drain conduit 170 and into the reservoir module 260.

Referring back to FIG. 4, the reservoir module 260 is directly located below both the garden module 210 and the aquarium module 325. This allows the water draining from the garden module 210 to naturally (e.g. by gravity) flow into the reservoir module 260 via the second drain conduit 170.

In a preferred embodiment, the reservoir module 260 may comprise a structural element 265 having a top section 266 matching the top of the removable container 252 once installed inside the tank. The structural elements 265 may have holes 267 configured to support plants, such as bamboos or the like. The roots of the plants can reach the water inside the reservoir module.

The reservoir module 260 is generally configured to hold the excess water from the aquaponic system 100 and to pump it back to the aquarium module 325 to maintain the circulation of water in the water circulation loop. In that sense, the reservoir module 260 generally comprises at least a pump 10 which is connected to the third conduit 180. Pump 10 pumps back the water held in the reservoir module 260 to the aquarium module 325 via the third conduit 180.

Referring now to FIG. 7, the reservoir module 260 is generally configured to further process the water before returning it to the aquarium module 325. For instance, in the present embodiment, the reservoir module 260 comprises a filter 263 communicating with the end of the second drain conduit 170. Understandably, in other embodiments, there could be no additional filter 263.

Still, in the present embodiment, the filter 263 is generally configured to filter out at least a portion of the waste products that have passed through the garden module 210. The filter 263 therefore prevents particles from being pumped back into the aquarium module 325.

In the present embodiment, the third conduit 180 is partially hosted by the reservoir module 260 and partially hosted by the hiding module 220. The third conduit 180 may be provided with at least one dampening region 182 for reducing the speed of the water during start up of the pump 10 and for preventing water from being ejected at the top extremity of the third conduit 180. These dampening regions are regions having a larger inner cross-sectional area than the nominal inner cross-sectional area of the third conduit 180. When the water coming up the third conduit 180 crosses the dampening region 182, the water flow slows down by filling first the enlarged dampening regions.

In the present embodiment, the top extremity of the third conduit 180 is adjacent to the top section of the transparent tank and is fluidly connected to a waterfall structure 222 comprising a capping module 221. The waterfall structure 222 is configured to let water falls into the aquarium module 325 when the water overfills the capping module 221. The capping module 221 forms an overflow reservoir 225 having a mouth 227 overhanging the transparent tank 253 for pouring the water from the overflow reservoir to the transparent tank 253 in a form of a waterfall.

In a preferred embodiment, the pump 10 functions continuously such that the waterfall structure 222 provides a constant water flow to the aquarium module 325.

In a preferred embodiment, the hiding module 220 is adapted to host all the conduits in a way to ensure the water circulation between the aquarium module 325, the garden module 210 and the reservoir module 260.

As mentioned above, the three main modules, the pump 10 and the various drains interconnecting them form a water circulation loop in which water flows from the aquarium module 325 to the garden module 210, then from the garden module 210 to the reservoir module 260, and then from the reservoir module 260 back to the aquarium module 325.

In a yet preferred embodiment, the kit 300 further comprises a timer-controlling module 240 to permit the harvesting of several crops during the year. Harvesting several crops during the year cannot normally be achieved in fluctuating climates where natural light varies according to the seasons. The timer-controlling module is configured to receive electrical power from a power source. The timer-controlling module is being electrically connected to the pump 10. The timer-controlling module 230 comprises two or more lamps 241 of a lighting system 240. The lamps 241 overhang the transparent tank and the garden module and allowing providing lights to the modules necessary for the life of the aquatic species and the growing plants. The timer-controlling module 240 further comprises a timer 230.

In a preferred embodiment, the controlling module 230 is further connected to a heating and/or cooling system located inside the reservoir module for controlling the temperature of the water circulating in the aquarium aquaponic assembly.

Figure 9:
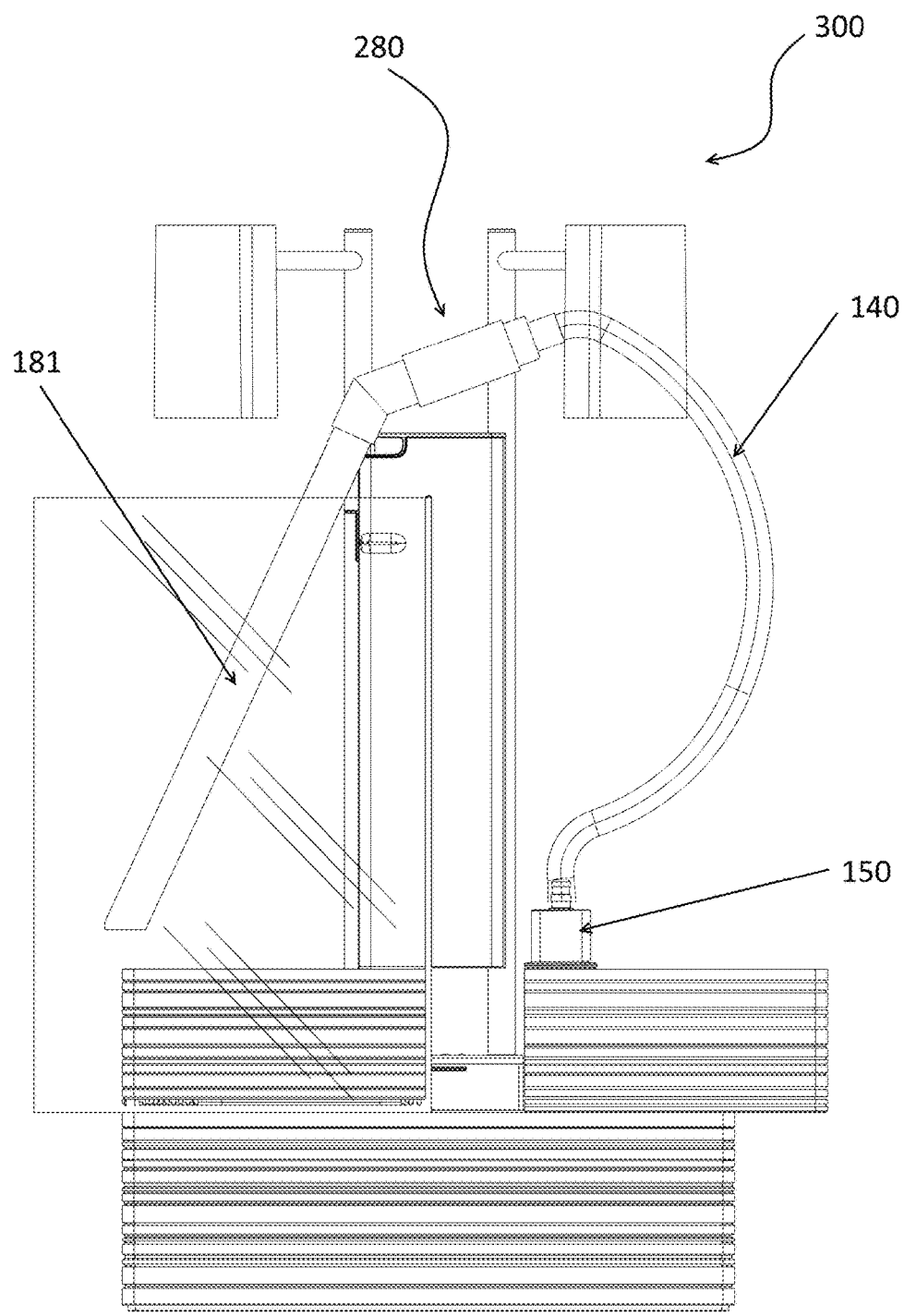
FIG. 9 is a front view of the kit for an aquarium aquaponic assembly including the cleaning module in accordance with a preferred embodiment of the present invention.

Referring to FIGS. 8 and 9, the kit 300 may further comprise an aquarium cleaning module 280. The cleaning module 280 typically comprises a soft tube 140, a priming hand pump 182 and a cleaning pipe or tube 181 generally used to remove waste and other debris found at the bottom of the aquarium module 325. The cleaning system is adapted to be connected to the garden module 260 by a connecting element 150. The cleaning tube 181 is adapted to have at least a length equivalent to the depth of the water tank 253 which allows sucking up water from the bottom section of the transparent tank 253. The soft tube 140 allows draining waste water from the aquarium module 325 to the garden module 210 during the cleaning procedure of the aquarium module. The priming hand pump 182 is connecting the rigid tube 181 to the soft tube 140. The activation of the priming hand pump 182 allows activating the suction of the cleaning module once the rigid tube is introduced in the water of the transparent tank.

In a preferred embodiment, the connecting element 150 is operatively connected to the first filter 214 when connected to the garden module 210 such as to filter the water sucked by the cleaning module before returning the water to the reservoir module.

In a preferred embodiment, the cleaning system 280 is configured to recycle the water while removing the waste build-up from the aquarium module 325 and irrigate the plants in the garden module 210. Consequently, maintenance of the aquarium module 325 is much easier as water changes significantly less required.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A kit for assembling an aquarium aquaponic assembly, the kit comprising:
   a reservoir module configured to receive water and having side walls extending from a bottom wall, the side walls having top ends defining a top opening;

an aquarium module comprising a transparent tank adapted to hold water for housing aquatic species; the transparent tank being supported by the reservoir module and having a bottom wall configured to engage, at least partially, the top opening of the reservoir module and be maintained by the top opening;

at least one garden module, each garden module being adapted for supporting a plant bed for growing terrestrial plant species, the garden module being also supported by the reservoir module and having a bottom wall configured to engage and be maintained by the top opening of the reservoir module;

a first drain conduit configured to fluidly connect a top section of the transparent tank of the aquarium module to the garden module;

a second drain conduit configured to fluidly connect the garden module to the reservoir module; and a pump located in the reservoir module to pump water back to the aquarium module via a third drain conduit configured to fluidly connect the reservoir module to the aquarium module;

wherein:

the aquarium module, the garden module, the reservoir module, the first, second and third drain conduits and the pump form a water circulation loop;

each garden module is located directly adjacent to one side of the aquarium module in a side-by-side configuration, the bottom wall of each garden module being located below an operating water level of the aquarium module such as to receive water therefrom by gravity; and the bottom wall of each garden module and the bottom wall of the aquarium module are located in a same plane when engaging the top opening of the reservoir module.

2. The kit as claimed in claim 1, comprising a hiding module configured to hide the first, second and third drain conduits, the hiding module engaging at least one wall of the transparent tank adjacent to the garden module, the hiding module being maintained by the transparent tank thus resting partially inside the aquarium module and partially outside the aquarium module where the hiding module is adjacent to the garden module.

3. The kit as claimed in claim 2, wherein the hiding module has a surface comprising a mark extending from the surface inside the transparent tank, the mark defining the operating water level of the aquarium module.

4. The kit as claimed in claim 2, further comprising a capping module to cap a top of the hiding module, the capping module forming an overflow reservoir for receiving water from the third conduit, the overflow reservoir having a mouth overhanging the transparent tank for pouring the water from the overflow reservoir to the transparent tank in a form of a fall.

5. The kit as claimed in claim 1, further comprising a first filter operatively connected to the first drain conduit for removing at least a portion of waste products contained in the water.

6. The kit as claimed in claim 1, wherein the aquarium module comprises a skimmer for connecting the first drain conduit to the top section of the transparent tank via an opening adjacent to the top section, the skimmer further allowing collecting a top layer of water located in the transparent tank and directing the water toward the garden module via the first drain conduit.

7. The kit as claimed in claim 1, wherein the first drain conduit comprises inwardly extending protrusions for breaking the flow of water such as to force water and air to mix.

8. The kit as claimed in claim 1, wherein the garden module comprises a draining system fluidly connected to the second drain conduit and configured to drain at least a portion of water contained in the garden module to the reservoir module.

9. The kit as claimed in claim 8, wherein the draining system comprises a bell siphon configured to start draining water contained in the garden module when the water reaches a first level, and to stop draining water contained in the garden module when the water reaches a second level lower than the first level.

10. The kit as claimed in claim 9, wherein the bell siphon comprises a removable cap, the removable cap comprising at least one aperture located above the first level, the at least one aperture being configured to allow air to flow in the bell siphon when the bell siphon drains the water, reducing as such a noise made by the water when the water is drained.

11. The kit as claimed in claim 1, further comprising a second filter fluidly connected to the second drain conduit, the second filter being configured to remove at least a portion of waste products contained in the water.

12. The kit as claimed in claim 1, wherein the third drain conduit comprises at least one dampening region having an inner cross-section larger than a nominal inner cross-section of the third drain conduit for reducing a speed of the water when the pump is started.

13. The kit as claimed in claim 1, wherein the third drain conduit has an extremity adjacent to the top section of the transparent tank and configured to return water into the aquarium module in a form of a fall.

14. The kit as claimed in claim 1, further comprising a timer-controlling module configured to receive electrical power from a power source, the timer-controlling module being electrically connected to the pump for controlling the pump.

15. The kit as claimed in claim 14, wherein the timer-controlling module is further operatively connected to a plurality of lamps with at least one lamp overhanging the transparent tank and at least one lamp overhanging each garden module, the lamps providing light source for the aquatic species and for the plants, the timer-controlling module allowing controlling an amount of light provided to the aquatic species and plants.

16. The kit as claimed in claim 1, further comprising a cleaning module for manually cleaning the transparent tank and each garden module by suction, the cleaning module comprising:

a rigid tube having one open end for sucking up water from a bottom section of the transparent tank;

a soft tube having one open end fluidly connected to the garden module; and a primary hand pump operatively connecting the rigid tube to the soft tube, the siphon allowing activating the suction of the cleaning module once the rigid tube is introduced in the water of the transparent tank.

17. The kit as claimed in claim 16, wherein the cleaning module comprises a connecting element for connecting and maintaining the soft tube within the garden module.

18. The kit as claimed in claim 17, further comprising a first filter operatively connected to the first drain conduit for removing at least a portion of waste products contained in the water; the connecting element being also operatively connected to the first filter when connected to the garden module such as to filter the water sucked by the cleaning module before returning the water to the reservoir module.

19. The kit according to claim 1, wherein the aquarium module further comprises a container configured to be removably disposed on the bottom wall of the transparent tank and adapted to support and grow aquatic plants.

20. An aquarium aquaponic assembly obtained by assembling the kit as claimed in claim 1.

* * * * *